Aug. 21, 1962  E. W. ELLIOTT ETAL  3,049,981
FILM THREADING DEVICE
Filed Dec. 26, 1957
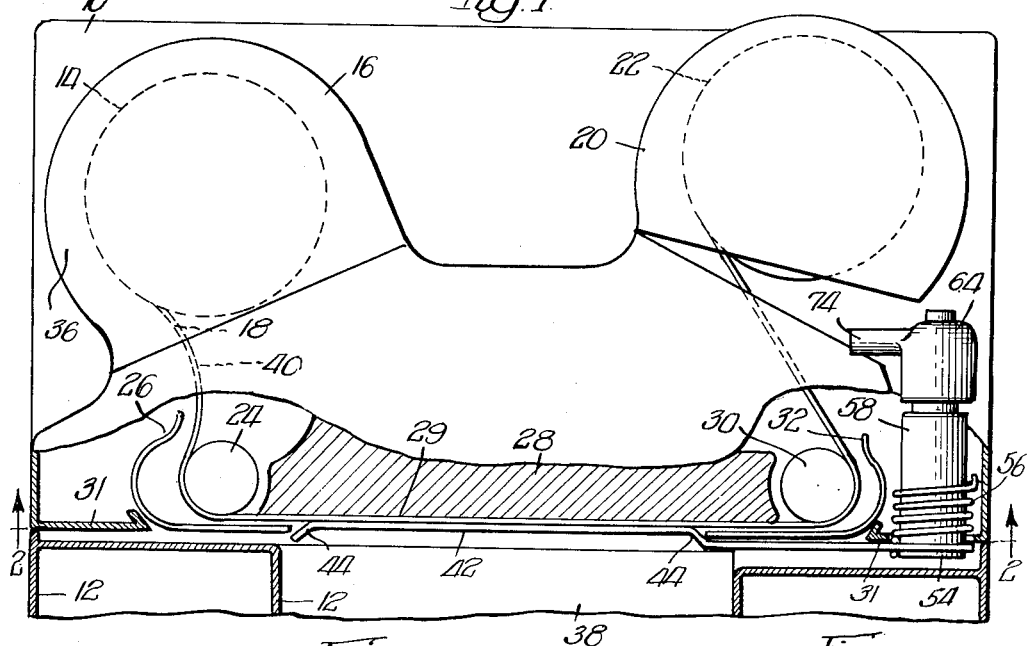
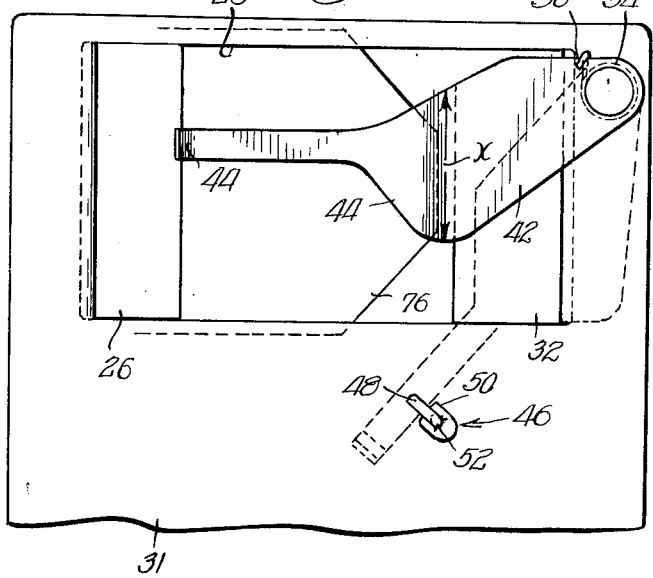
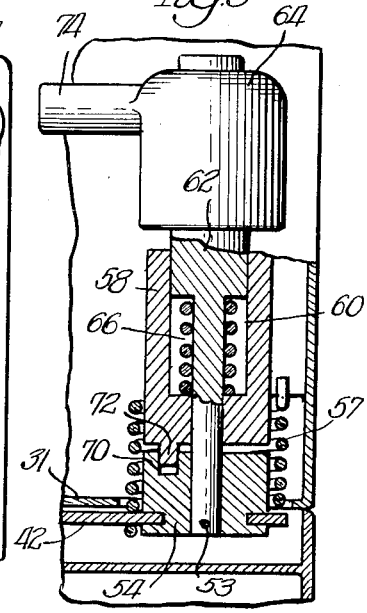
INVENTORS.
Eugene W. Elliott,
BY Elmer J. Bury,
Byron, Hume, Groen & Clement
Attys.

United States Patent Office 3,049,981
Patented Aug. 21, 1962

3,049,981
FILM THREADING DEVICE
Eugene W. Elliott, Oak Park, and Elmer J. Bury, Wheaton, Ill., assignors, by mesne assignments, to Chicago Aerial Industries, Inc., Melrose Park, Ill., a corporation of Delaware
Filed Dec. 26, 1957, Ser. No. 705,317
5 Claims. (Cl. 95—34)

This invention pertains to photographic equipment and in particular to means for threading the film in a cassette type camera.

Cameras used in aerial photography have been adapted to use removable film cassettes. One of the advantages of a film cassette is to minimize the amount of handling necessary in loading and unloading the film. This advantage, however, is somewhat frustrated if the camera body must be removed from the lens cone in order to thread the film across the format aperture.

In aerial cameras using film cassettes the film must travel across a relatively large format aperture which makes it difficult to thread the film. This aperture is inaccessible to the operator when the lens cone and camera are assembled. Heretofore it has been the practice to remove the lens cone when threading the film and manually guide the film across the format aperture. As was mentioned previously, disassembly of the camera and lens cone partially defeats the convenience of using a cassette type film holder.

Therefore, it is an object of the invention to provide a film guide means to be used in conjunction with a cassette type camera.

A still further object of the invention is to provide a film guide means that will prevent assembly of the cassette when the guide means obstructs the format aperture.

A still further object of the invention is to provide a film guide means that may be used in conjunction with present commercial cameras having cassettes.

These and other objects will be apparent upon reading of the specification with reference to the drawings.

In the drawings:

FIGURE 1 is a side view in elevation showing a camera embodying the invention.

FIGURE 2 is a view taken along the line 2—2 in FIGURE 1.

FIGURE 3 is a fragmentary cross section in greater detail of the view shown in FIGURE 1.

Referring now to the drawings, there is shown a camera body generally denoted by the numeral 10. The device 10 is assembled to a lens cone 12 of any suitable type. The unexposed film is stored in the form of a spool 14 in the supply cassette 16. After the film 18 has been exposed, it is then received into the take-up cassette 20 on a spool 22. The mechanism (not shown) for operating the cassettes and the assembly for mounting the spools (not shown) may be of any well known type.

A roller 24 is rotatably mounted below the supply cassette 16 as shown in FIGURE 1. A guide bar 26 is secured adjacent to the roller 24 and is adapted to co-operate therewith to guide the film around the roller. As shown in the drawing, the film extends downwardly from the spool 14, through any operating devices (not shown), and around the roller 24 between it and the guide bar 26. The film continues across the format aperture plate 28 and the format aperture 29 which is formed by the ends of the guide bars 26 and 32 and the plate 31, to another roller 30 similar to roller 24. A second guide bar 32 is adapted to co-operate with the roller 30 for purposes of maintaining the film in its proper position while passing over roller 30. The film is finally received in the cassette 20 and wound on the spool 22 as was mentioned previously.

When the film is being threaded from the roller 24 to the roller 30, it must pass over the format aperture 29 which is aligned with the camera lens cone 12. In fact, when the film is being threaded through the camera, the end of the film will generally tend to drop downwardly through the aperture 29 into the camera lens cone 12 rather than continue across to the guide bar 32 in order to be pushed around the roller 30. Consequently it is generally necessary for the lens cone to be disassembled from the camera in order that the operator can guide the end of the film 40 across the format aperture 29 except where the following guide means is provided.

The guide means includes a finger 42 which extends across the format aperture 29 as shown in the drawings. The finger 42 as shown in FIGURE 1 has an inverted cup-like cross-section which extends up into the format aperture 29 when in operative position. The finger is also provided with the rounded corners 44 so as to form a smooth transition between it and the ends of the guide bars 26 and 32. As the end of the film 40 approaches the end of the guide bar 26, it slides up over the rounded portion 44 onto the finger 42. As the film continues across the finger 42, the end then slides down the rounded portion 44 onto the guide bar 32 until finally it emerges between the latter and the roller 30.

After the film has been threaded, the finger 42 is moved out of operative position so as to remove any obstruction from across the format aperture 29. The finger 42 when in the inoperative position assumes the position indicated by the dotted lines. When in this position, the finger is held by the cushion stop generally denoted by the numeral 46. In its preferred embodiment the cushion stop 46 is comprised of an overlapping spring guide 48, a rubber cushion 50, both of which are secured to the camera body by the screw 52.

As shown in FIGURE 2, the finger 42 is nonrotatably secured at one end to the shaft 53 by the collar 54 which extends through the plate 31. A torsion spring 56 is mounted on the collar 54 with one end secured to the finger 42 so as to bias the finger towards its inoperative position. Referring back to FIGURE 3, there is shown a preferred embodiment for mounting the finger 42. A housing member 58 is secured to the camera by any suitable means and is provided with a bore 60 which receives one end 62 of the handle 64. The end 62 co-operates with the bore 60 to resiliently confine the coil spring 66 therein. A shaft 53 extends downwardly from the end 62 and is nonrotatably secured to the collar 54. The collar 54 is provided with a slot 70 which receives the key member 72 when the finger is in operative position. As can be seen from FIGURE 1, the key member 72 is biasingly held in the slot 70 by the coil spring 66. When it is desired to move the finger 42 into its inoperative position, the handle 64 is pressed downwardly against the force of the spring 66 until the slot 70 is disengaged from the key 72. At this point the spring 56 forces the finger 42 back against the stop 46.

The handle 64 is provided with the projection 74 which extends when the finger is in operative position between the cassette 20 and the camera body 10. In this manner the cassette 20 cannot be assembled into operative position as long as the finger 42 is obstructing the format aperture 29. Accordingly any possibility of exposing the film when the finger is in operative position is eliminated.

In its prefered embodiment the finger 42 is provided with its dimension X which is preferably greater than the width of the tongue 76 conventionally provided on photographic film. In this manner any tendency to tear the film when being guided across the format aperture is eliminated.

It can now be seen that a simple and yet effective means is provided for guiding the film when it is being threaded across the format aperture. This mechanism is adapted to be used with conventional cameras having cassettes. Moreover, the guide means is so constructed that it eliminates any possibility of exposing the film during camera operation while the format aperture is obstructed.

Although certain specific terminology has been used in the description of the invention, it is contemplated that this is merely by way of example and is not to be construed in any manner as a limitation. It is apparent that certain modifications may be made within the scope of the claims without departing from the spirit of the invention.

We claim:

1. In a photographic device the combination comprising a camera body having a first cassette for supplying unexposed film, a take-up cassette for holding exposed film, and a format aperture plate disposed between said first and second cassettes, and a finger means when in operative position extending across said format aperture plate for guiding said film, a spring biasing said finger means toward its inoperative position, and means for rendering said take-up cassette inoperative when said finger means is in its operative position.

2. In a photographic device the combination comprising a camera body, said camera body having a first cassette for supplying unexposed film, a take-up cassette for holding exposed film, and a format aperture plate disposed between said supply cassette and said take-up cassette, a lens cone optically aligned with said format aperture plate, a finger means when in operative position extending across said format aperture plate for guiding said film, a spring means biasing said finger means toward its inoperative position, means for rendering said take-up cassette inoperative when said finger means is in its operative position, and means for releasably holding said finger means in its operative position.

3. A cassette type photographic device comprising a first cassette for holding unexposed film, a take-up cassette for holding exposed film, a format aperture plate disposed between said first and second cassettes, a finger means when in operative position extending across said aperture plate for guiding said film, spring means biasing said finger means toward its inoperative position, means for rendering said take-up cassette inoperative when said finger means is in its operative position, and means for releasably holding said finger means in its operative position.

4. A cassette type photographic device comprising a first cassette for holding unexposed film, a take-up cassette for holding exposed film, a format aperture plate disposed between said first and second cassettes, said format aperture plate having an aperture across which the film passes when being exposed, a finger means when in operative position extending across said aperture for guiding the said film across said aperture, a spring means biasing said finger toward its inoperative position, means for rendering said take-up cassette inoperative when said finger means is in its operative position, and means for releasably holding said finger means in its operative position.

5. A cassette type photographic device comprising a first cassette for holding unexposed film, a take-up cassette for holding exposed film, a format aperture plate disposed between said first and second cassettes, said format aperture plate having an aperture across which the film passes when being exposed, a lens cone optically aligned with said aperture, a finger means when in operative position extending between said lens cone and said aperture plate across said aperture for guiding the said film said aperture, a spring means biasing said finger toward its inoperative position, means for rendering said take-up cassette inoperative when said finger means is in its operative position, and means for releasably holding said finger means in its operative position.

References Cited in the file of this patent
UNITED STATES PATENTS

| | | |
|---|---|---|
| 1,289,357 | Andrews | Dec. 31, 1918 |
| 1,707,980 | Guerin | Apr. 9, 1929 |
| 1,835,457 | Briechle | Dec. 8, 1931 |
| 2,084,473 | Becker | June 22, 1937 |
| 2,153,665 | Goldhammer | Apr. 11, 1939 |
| 2,319,530 | Bolsey | May 18, 1943 |
| 2,420,587 | Dietrich | May 13, 1947 |
| 2,459,628 | Descombes | Jan. 18, 1949 |
| 2,482,596 | Rattray et al. | Sept. 20, 1949 |

UNITED STATES PATENT OFFICE

CERTIFICATE OF CORRECTION

Patent No. 3,049,981            August 21, 1962

Eugene W. Elliott et al.

It is hereby certified that error appears in the above numbered patent requiring correction and that the said Letters Patent should read as corrected below.

Column 4, line 27, after "film" insert -- across --.

Signed and sealed this 25th day of December 1962.

(SEAL)
Attest:

ERNEST W. SWIDER
Attesting Officer

DAVID L. LADD
Commissioner of Patents